United States Patent [19]
Taylor, Jr.

[11] 4,353,200
[45] Oct. 12, 1982

[54] TOBACCO HARVESTING MACHINE
[76] Inventor: Harold W. Taylor, Jr., Rte. 3, Shepherdsville, Ky. 40165
[21] Appl. No.: 300,778
[22] Filed: Sep. 10, 1981
[51] Int. Cl.³ .......................................... A01D 45/16
[52] U.S. Cl. ................................................... 56/27.5
[58] Field of Search ...................................... 56/27.5

[56] References Cited
U.S. PATENT DOCUMENTS
3,902,607  9/1975  Middleton ........................... 56/27.5

Primary Examiner—Jay N. Eskovitz
Attorney, Agent, or Firm—Richard L. Caslin

[57] ABSTRACT

A tobacco harvesting machine is shown for use in automatically impaling the stalks of standing tobacco plants onto a tobacco stick that is fixed on the machine in a horizontal position. The machine is a wheeled platform that supports a pair of parallel, rotating augers on which a tobacco stick is positioned in a horizontal, fixed position. The front end of the platform is provided with a wide, inwardly-tapered cutout channel that is aligned with the tobacco stick. There is a swinging pair of knife blades supported from the platform that move between a first inoperative position and a second operative position for forming a wide gap in the stalk of a tobacco plant so that the stick may be forced through the gap. The augers serve to force the stalk of the tobacco plant rearwardly on the tobacco stick. Moreover, there is an automatic cutting means for severing the stalk from the ground after the plant is positioned on the tobacco stick.

7 Claims, 7 Drawing Figures

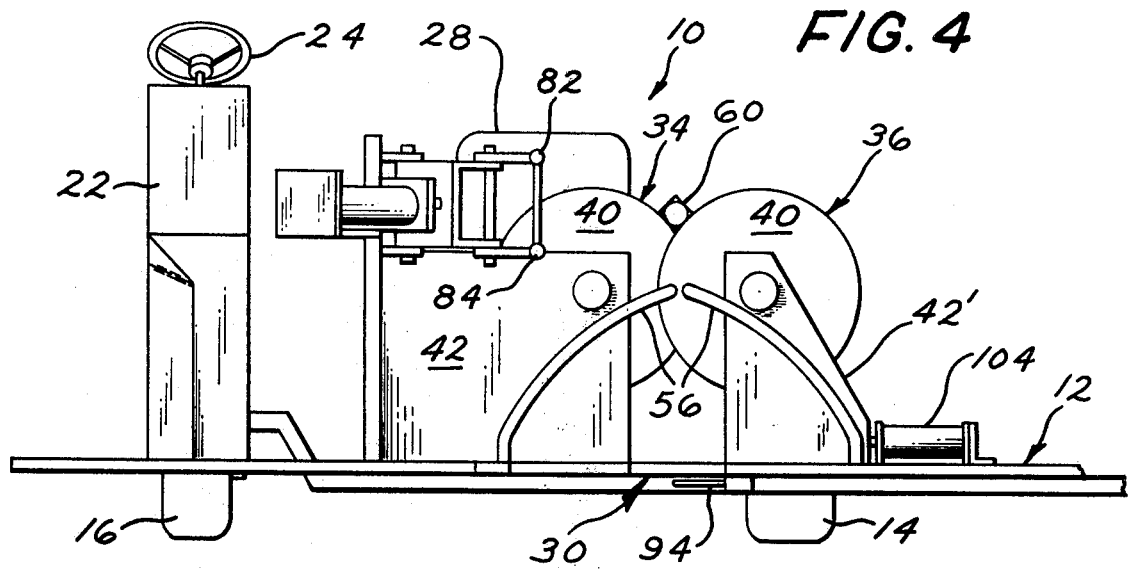
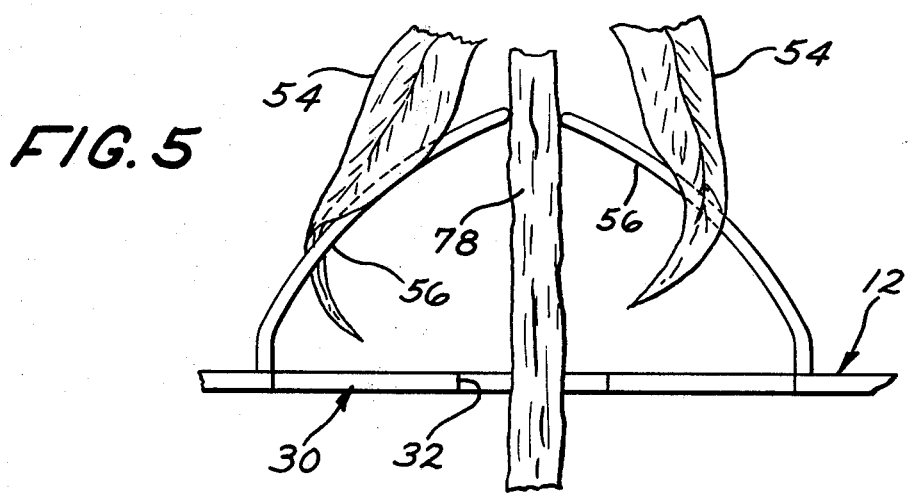
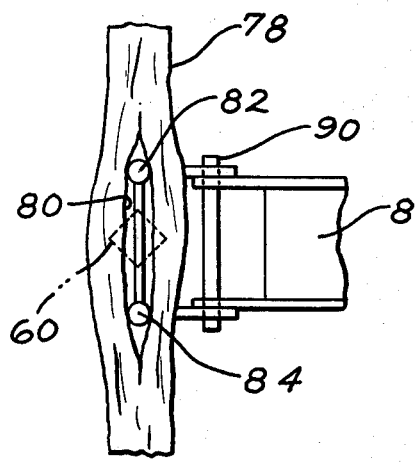
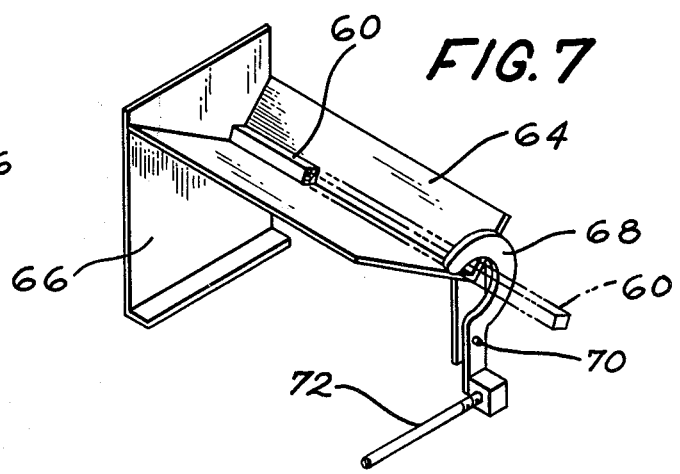

TOBACCO HARVESTING MACHINE

BACKGROUND OF THE INVENTION

1. Field of the Invention

This invention relates to a tobacco harvesting machine that is capable of running down a row of standing tobacco stalks, and means for splitting open the stalk while still standing, so as to impale the stalk onto a horizontally disposed tobacco stick, and then severing the stalk from the ground so as to successively fill up the tobacco stick with a load of tobacco stalks.

2. Description of the Prior Art

Some earlier patents have issued on tobacco harvesting equipment for use in mechanically loading the tobacco stalks onto the tobacco sticks, so as to take some of the manual labor out of the task of harvesting tobacco. The majority of these patented machines are quite old, while the few recent ones are quite complex and expensive.

One early patent is the De Leon U.S. Pat. No. 1,055,023 which describes a tobacco harvesting machine that is first adapted to automatically sever the growing tobacco stalk near the ground, and then spear the stalk by impaling it upon a suitable impaling needle, which is merely shown in phantom view without an explanation of how the needle is supported in the machine. This machine has a pair of pivoted stalk-engaging heads or clamps which support the severed stalk so that the impaling needle can be thrust through the stalk.

The Nunnelley et al U.S. Pat. No. 1,090,747 shows a tobacco harvesting machine on which is positioned a horizontal tobacco stick that is furnished with a spearhead on the front end thereof. The front end of the stick is supported by a pair of spring guide arms that engage the spearhead. There is a fixed cutter or knife blade behind the spearhead, and there is a reciprocating packer which has a series of longitudinally spaced saw teeth so that one tooth of the packer engages behind the tobacco stalk and forces the stalk onto the tip of the spearhead and starts to move the stalk rearwardly of the tobacco stick, and in so doing the cutter or knife blade severs the stalk from the ground.

The Pence U.S. Pat. No. 1,217,495 shows a tobacco harvesting machine very similar to the previous patent. This equipment affords means for mechanically spearing and stringing the tobacco in the field. A V-shaped cutter or knife is positioned near the front of the machine for severing the stalk. The machine also has a floating spearhead that is held by a pair of spring clamps. A horizontal tobacco stick has its forward end adapted to fit into a cavity at the rear of the floating spearhead. The machine carries master hooks which pass around to the back side of the stalk, and then, as a lever is pulled, the hooks grasp the stalk and force it against the point of the spearhead causing the spearhead to pierce through the center thereof. The clamps which hold the spearhead will be caused to spring open so that the stalk may pass between the clamps toward the other end of the tobacco stick. As the stalk is pierced by the tobacco stick, the knife will engage the stalk below the stick and the stalk will be severed from the ground.

The Smith U.S. Pat. No. 3,258,137 describes a tractor-driven tobacco stalk spearing apparatus, and particularly a floating type spear and cooperating means for moving and guiding the tobacco stalk in a straight line motion to the opposite end of the spear. There are two cutting discs for severing the stalk from the ground. There are also a pair of conventional gathering chains which have spike projections thereon to engage and bite into the tobacco stalks above the cut line. There is a complex floating spear assembly that is positioned in front of a tobacco stick, and this spear element serves to pierce the stalk. There are also two helical conveyors which cooperate with the floating spear element for moving the stalks down the tobacco stick.

The Anderson U.S. Pat. No. 3,262,587 describes a motor-driven vehicle upon which is mounted a power-driven circular saw for cutting the tobacco stalks. A magnet is fixed in the platform of the machine for engaging a metal spike that is conical and hollow. A tobacco stick is supported in the hollow conical spear and braced at the opposite end against graduated steps. The stalks would have to be manually forced onto the spear and onto the sticks.

The Middleton U.S. Pat. No. 3,902,607 describes a tobacco harvester that is drawn by a tractor, and there are guides at the front of the machine for leading the tobacco stalks into a circular saw which severs the stalks near the ground. A pair of belts grasp and convey the severed plants upwardly and rearwardly. The tobacco plants are laid over as they rise, and then dropped downward, free of the belts. There is a synchronizing system which produces one increment of rearward motion of the horizontal conveyor. A plurality of chains are equipped with parallel sets of pushers which intermittently move the tobacco plants rearwardly under direction of the synchronizing system, thereby impaling the butts of the stalks in sequence on the point of a spear that is fixed in a horizontal position between vertically related plant-centerng rollers.

OBJECTS OF THE PRESENT INVENTION

The principal object of the present invention is to provide a tobacco harvesting machine with means to open a gap in the stalk of a standing tobacco plant and then forcing a tobacco stick through the gap and then moving the plant rearwardly of the stick so that this action can be repeated on the next standing tobacco plant until the tobacco stick is full of plants and must be removed and replaced by an empty tobacco stick to complete the cyle.

A further object of the present invention is to provide a tobacco harvesting machine of the class described with a swinging pair of knife blades supported from the machine between a first inoperative position and a second operative position for piercing the stalk of a standing tobacco plant.

A further object of the present invention is to provide such a machine with a pair of cooperating augers in association with the fixed tobacco stick for shifting the tobacco plants rearwardly on the stick.

A further object of the present invention is to provide such a machine with automatic cutting means for severing the stalk of the plant from the ground after the plant is properly positioned on the tobacco stick.

SUMMARY OF THE INVENTION

The present invention provides a tobacco harvesting machine that comprises a wheeled platform supporting a pair of parallel, rotating augers on which a tobacco stick is positioned in a generally horizontal, fixed position adjacent the top center thereof. The front end of the platform is provided with a tapered cutout channel that terminates in a narrow, elongated groove underlying the frontmost end of the tobacco stick. A swinging pair of knife blades are supported on the platform, and they serve to pierce the stalk of a standing tobacco plant to form a wide gap so that the tobacco stick may be forced through the gap. The augers serve to force the stalk of the tobacco plant rearwardly on the tobacco stick. Automatic cutting means are provided for severing the stalk of the tobacco plant from the ground after the plant is properly positioned on the tobacco stick.

BRIEF DESCRIPTION OF THE DRAWINGS

This invention will be better understood from the following description taken in conjunction with the accompanying drawings and its scope will be pointed out in the appended claims.

FIG. 4 is a front elevational view of the harvesting machine of FIGS. 1 and 2 with part of the right side of the view broken away.

FIG. 5 is a fragmentary view of the front end of the machine showing a portion of a standing tobacco plant and the relationship between the lower leaves of the plant and the upwardly-arched guide rails that cooperate with the wide, inwardly-tapered cutout channel at the front end of the machine.

FIG. 6 is a fragmentary, elevational view, on an enlarged scale, that is taken on the line 6—6 of FIG. 3 looking frontwardly of the machine and seeing the stalk of a standing tobacco plant having been pierced by a pair of swinging knife blades that form a wide gap in the stalk so that the gap is provided to receive the tip of the tobacco stick therein.

FIG. 7 is a fragmentary, perspective view near the rear of the harvesting machine showing the method of supporting and clamping the rear end of the tobacco stick in a fixed position so that the stick is in a position to be loaded with tobacco plants as this machine runs down a row of standing tobacco plants in the field.

DESCRIPTION OF THE PREFERRED EMBODIMENTS

Figure 1:
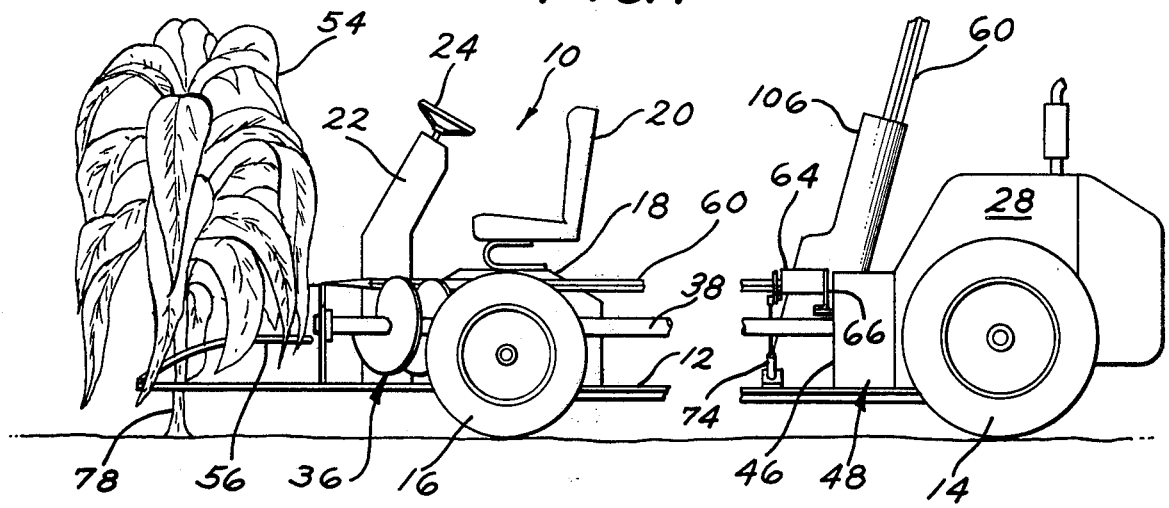
FIG. 1 is a left side elevational view of the tobacco harvesting machine of the present invention, showing the front end of the machine approaching a standing tobacco plant.

Turning now to a consideration of the drawings, and, in particular, to the left side elevational view of FIG. 1, there is shown a tobacco harvesting machine 10 embodying the present invention. This machine has a wheeled platform 12 having a pair of rear driving wheels 14 and a pair of front steerable wheels 16. Notice in the top plan view of FIG. 2 that the two right-hand wheels are in line with each other, while the front left-hand wheel is located at a greater distance from the opposite front wheel than the two rear wheels 14. It must be remembered that this tobacco harvesting machine is to be used in a tobacco field and is to run down the field with the wheels operating between the rows of tobacco plants so as not to injure any of the standing plants. Also notice in the plan view of FIG. 2 that the front right wheel is covered with a housing 18 and a driver's seat 20 is positioned over the housing. Positioned in front of the driver's seat is the necessary steering column 22 and steering wheel 24 for controlling the direction of the front wheels 16. In the preferred embodiment, the wheelbase of the front wheels, measured from the centerline thereof, is 4 feet 9 inches, while the wheelbase for the back wheels 14 is 30 inches. A rear drive motor 28 is of a size between 5 and 10 horsepower for driving the rear wheels 14. This harvesting machine is designed to travel at a speed of about 8 inches per second.

Figure 2:
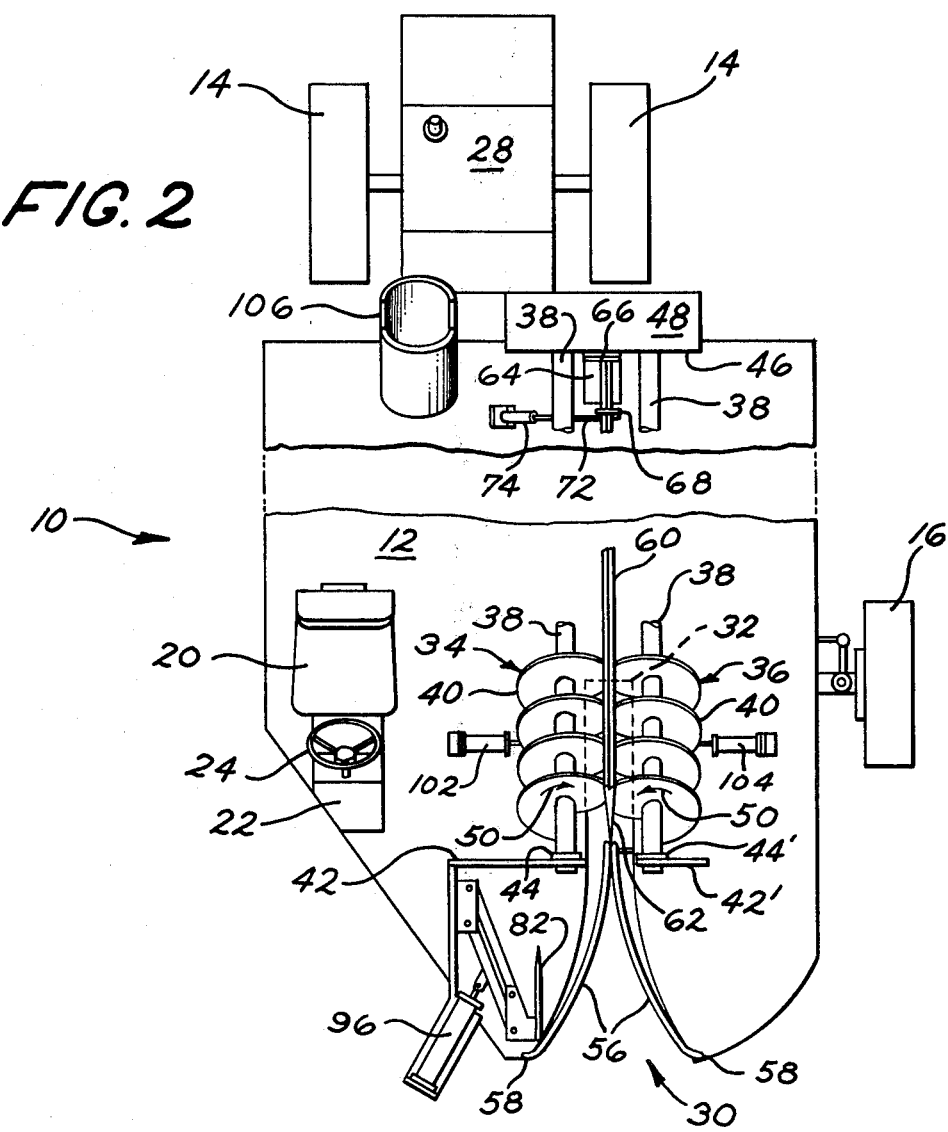
FIG. 2 is a top plan view of the harvesting machine of FIG. 1, it being understood that both of these FIGS. are broken in the middle in order for them to fit on the drawing with a large enough scale to assist in understanding the construction and operation of the invention.

The platform 12 is generally a flat bed that is about twice as long as it is wide, and it is positioned above the ground by about 7 inches. Tobacco plants are generally planted about 16 inches apart in long rows, and the stalk of the plant at maturity is between 1 and ½ inches to 2 and ½ inches in diameter. As is seen in FIG. 2, the front end of the platform 12 is provided with a wide, inwardly-tapered cutout channel 30 that terminates as a narrow, elongated groove 32 that extends longitudinally of the platform for a short length thereof. Centered over the groove are a pair of generally parallel, rotating augers 34 and 36. Each auger has a longitudinal shaft 38 and a spiral blade 40. The front end of auger 34 is journaled in a vertical mounting plate 42 as at the journal bearing 44. Similarly, the front end of the auger 36 is supported in the vertical mounting plate 42' in the journaled bearing 44'. The rear ends of the two shafts 38, 38 are journaled in a rear mounting plate 46, and they are provided with spur gears (not shown) which are associated with a power takeoff mechanism 48 that is assembled with the rear drive motor 28 so that the motor is capable of driving the augers in counter directions, as is shown by the directional arrows 50.

Figure 3:
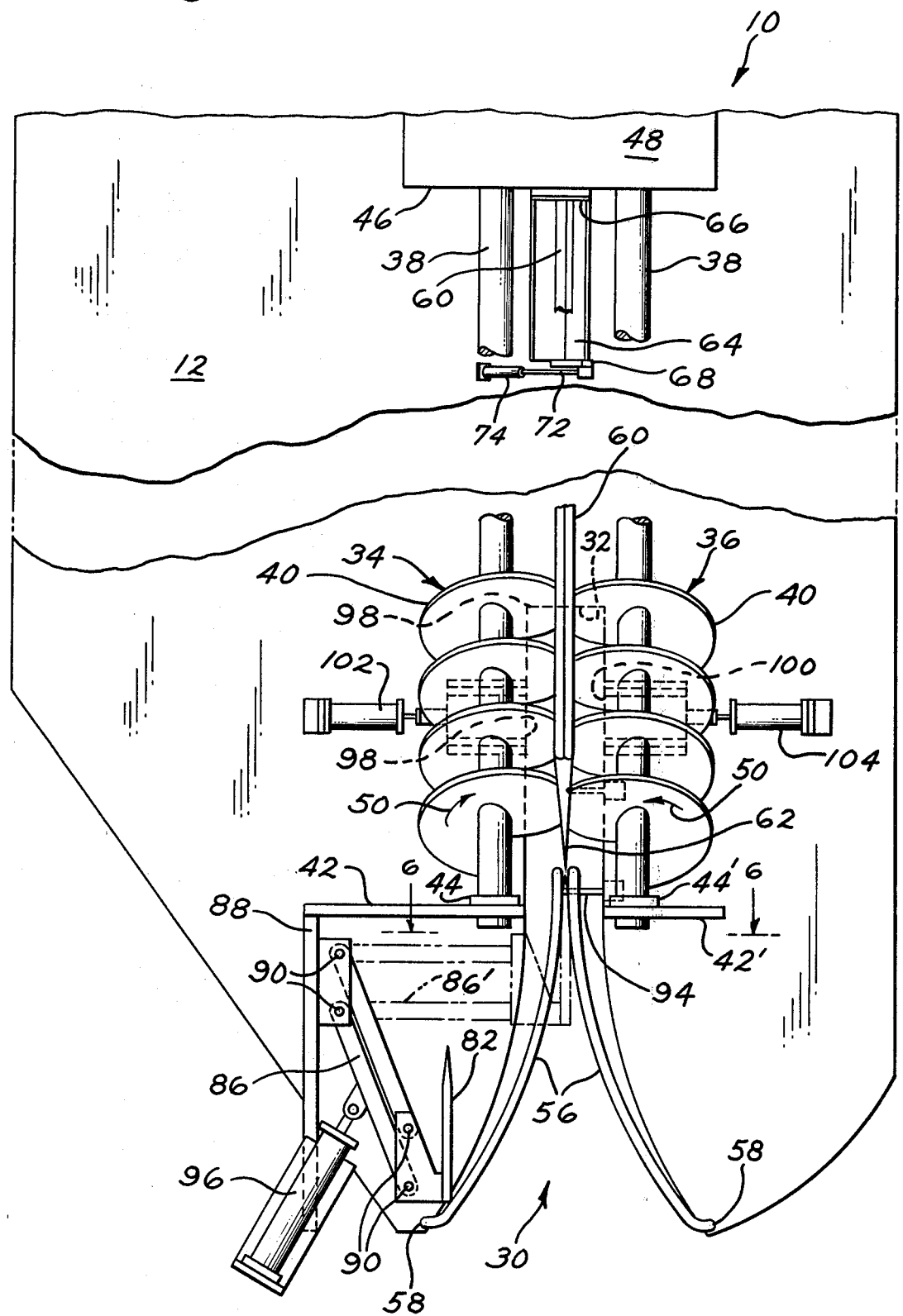
FIG. 3 is a fragmentary, top plan view of the front portion of the machine, on an enlarged scale, to assist in understanding the invention.

FIG. 1 shows a standing tobacco plant 54, with the harvesting machine 10 approaching from the right side. The machine is guided so that the plant 54 will be lined up with the inwardly-tapered channel 30, as is best seen in FIG. 2. Each side edge of the channel is provided with an upwardly-arched guide rail, where ech rail is mounted at the front of the platform, as at 58. These rails serve to raise the lower leaves of the tobacco plant so as to protect these leaves from damage by any of the adjacent mechanisms. Notice in FIGS. 1 and 2 that a tobacco stick 60 has been placed or centered on top of the two augers 34 and 36 with the pointed end 62 facing forward of the machine. A standard tobacco stick is between about 4 feet 6 inches and 5 feet long. The rear end of the tobacco stick 60 is cradled in an angular seat or trough 64, as is best seen in FIG. 7. The angular nature of this seat serves to center the stick 60 automatically. This angular seat 64 is a generally horizontal member that is supported from a vertical mounting plate 66 from the platform 12. In order to fix this rear end of the tobacco stick 60, a pivoted hook member 68 is provided which is capable of pivoting about a pivot pin 70, so that the hook member is a releasible clamping means for the rear end of the stick. In the position as shown in FIG. 7, the stick is firmly clamped in place. The lower end of the hook member 68 is provided with a piston rod 72 of a hydraulic cylinder 74, as is best seen in FIG. 3.

A primary objective of the present invention is to automatically impale the stalk of the standing tobacco plant 54 onto the fixed tobacco stick 60. Attention is directed to FIG. 6 of the drawings. A portion of a tobacco plant is shown having a stalk 78. It is a purpose of the present invention to open a gap 80 in the stalk 78 to be in alignment with the longitudinal axis of the fixed tobacco stick 60, so that the tip 62 of the stick will move into the gap and the stalk will pass rearwardly onto the stick. This gap 80 is formed in the stalk 78 by means of a pair of vertically-spaced knife blades 82 and 84. This vertical pair of knife blades 82 and 84 is mounted on a swinging 4-bar linkage mechanism 86, where the mechanism is supported from the platform 12 by means of a vertical mounting plate 88. This mechanism is adapted to swing in a generally horizontal plane between a first inoperative position, as is seen in FIGS. 1, 2 and 3 in full lines, and a second operative position, which is shown in phantom view or dotted lines in FIG. 3, as at 86'. This mechanism 86 has four pivot points 90. Notice that the knife blades 82 and 84 are positioned to face rearwardly of the platform 12 at substantially all times, so that the blades either parallel the longitudinal axis of the fixed tobacco stick 60 or they coincide with the tobacco stick, as is shown in the phantom view or dotted line view 86' in FIG. 3. It is when the two knife blades 82 and 84 are embedded through the stalk 78 of the tobacco plant that the tip 62 of the tobacco stick 60 is forced through the gap. After this event, the machine 10 continues forwardly, and the two knife blades 82 and 84 are withdrawn to the inoperative position separated from the stalk and withdrawn off to the side, as is clear in FIG. 3. An electromechanical switch 94 is positioned at the point of impact to signal the presence of the stalk 78 of the tobacco plant in a position to be struck by the two knife blades 82 and 84 to form the gap 80 just prior to the time the tip 62 of the fixed tobacco stick moves forwardly through the gap. As the machine progresses forwardly, the switch 94 will move out of contact with the stalk and cause the 4-bar linkage 86 of the knife blades 82 and 84 to be withdrawn by means of a hydraulic cylinder 96 which serves as the actuating means for the 4-bar linkage. As the vehicle 10 continues forwardly, the stalk 78 will become engaged by the two counterrotating augers 34 and 36. The spiral blades 40 serve to slide the stalk 78 gently rearwardly on the stick so that the stick does not clutch the stalk and carry the stalk forwardly with the stick. After a short distance, the stalk will reach a position between a pair of opposing knife edges 98 and 100 which are positioned beneath the two augers 34 and 36 and are movable transversely toward and away from each other, so that they serve with a shearing action to cut the stalk 78 from the ground, so that the two augers 34 and 36 will continue to slide the stalk 78 of the tobacco plant rearwardly on the tobacco stick 60. It should be understood that the two augers do not have spiral blades that extend for the complete length of the machine. These augers merely serve to move the stalk of the tobacco plant from the impact zone in the vicinity of the switch 94, and then through the cutting zone of the two knife edges 98 and 100. Then the augers release the plant, but as the next plant is impaled on the stick, it is forced rearwardly and one plant will push rearwardly of the adjacent plant until the stick becomes completely filled with tobacco plants, at which point the machine 10 is stopped and the operator will unclamp the pivoted hook member 68 so as to release the tobacco stick 60. Then the operator will lift the stick from its position and step over to the edge of the machine and force the stick into the ground in the manner of a spear so that the plants will be stored in this position until they can be retrieved later after the harvesting operation has been completed. Each opposing knife edge 98 and 100 is provided with a hydraulic cylinder means 102 and 104 respectively for effecting the cutting action as needed. A suitable electromechanical switch or hydraulic control valve would be positioned in the vicinity of these two knife edges to serve as an automatic control means for this cutting action.

FIG. 4 merely shows a front view of this tobacco harvesting machine 10, and the relative location of the various elements that have been described above.

FIG. 5 shows the stalk 78 of a standing tobacco plant 54, and the mode of operation of the upwardly-arched guide rails 56 which serve to lift the lower leaves of the plant so that they do not become injured by the adjacent mechanisms.

Modifications of this invention will occur to those skilled in this art. Therefore, it is to be understood that this invention is not limited to the particular embodiments disclosed, but that it is intended to cover all modifications which are within the true spirit and scope of this invention as claimed.

A supply of tobacco sticks 60 is carried on the vehicle in a barrel 106 which has the front wall cut down for ease in removing the sticks one stick at a time. Of course, this barrel may be positioned at one of several available positions. One such position is horizontal over the engine 28.

What is claimed is:

1. In a tobacco harvesting machine for automatically impaling the stalks of standing tobacco plants onto a tobacco stick, said machine comprising in combination:
    (a) a wheeled platform supporting a cooperating pair of generally parallel, rotating augers on which a tobacco stick is positioned in a generally horizontal, fixed position adjacent the top center of the augers;
    (b) the front end of the said platform being provided with a wide, inwardly-tapered cutout channel that terminates as a narrow, elongated groove underlying the frontmost portion of the tobacco stick, said channel being adapted to be lined up with a standing row of tobacco plants;
    (c) and a swinging pair of knife blades supported from the platform between a first inoperative position and a second operative position for piercing the stalk of a standing tobacco plant and forming a wide gap in the said talk in the vicinity of the front tip of the said horizontal tobacco stick so that the stick may be forced through the gap;
    (d) and automatic control means for operating the position of the knife blades depending upon the relative position of the nearest tobacco plant;
    (e) the said rotating augers serving to force the stalk of the tobacco plant rearwardly on the tobacco stick;
    (f) and automatically-controlled cutting means for severing the stalk of the said tobacco plant from the ground after the plant is positioned upon the tobacco stick.

2. The invention as recited in claim 1 wherein the said pair of augers are counterrotating in a direction toward the said supported tobacco stick, and the rear end of the tobacco stick is provided with an adjustable clamping means that is supported from the said platform.

3. The invention as recited in claims 1 or 2 wherein the said swinging pair of knife blades is supported from a 4-bar linkage mechanism whereby the pair of knife blades are horizontally arranged within a vertical plane, and the tips of the knife blades face rearwardly of the platform in a direction that either parallels or coincides with the longitudinal axis of the fixed tobacco stick.

4. The invention as recited in claim 1 wherein the said automatically-controlled cutting means comprises a pair of opposing knife edges which are located beneath the augers and are movable transversely toward and away from each other, and where the cutting action takes place adjacent a line that lies generally in a vertical plane that includes the longitudinal axis of the fixed tobacco stick.

5. The invention as recited in claims 1 or 4 wherein the said wheeled platform is a self-propelled vehicle having a motor-drive mechanism adjacent the rear of the platform, and power take-off means cooperating with the said motor-drive mechanism for driving the said pair of augers, and a front-steering mechanism for guiding the harvesting machine in its travels, the platform including standing room adjacent at least one side of the pair of augers for allowing an operator to unclamp the fixed end of the tobacco stick for removing and replacing it.

6. The invention as recited in claims 1 or 4 wherein the said swinging pair of knife blades and the said automatically-controlled cutting means are provided with hydraulic clyinder means, and automatic hydraulic-controlled valves for operating these cylinder means respectively when the stalk of a tobacco plant is to be pierced and when the said stalk is to be severed from the ground.

7. The invention as recited in claim 1 wherein each side of the said wide, inwardly-tapered cutout channel at the front end of the platform is provided with an upwardly-arched guide rail starting at the frontmost edge of the platform so as to raise the lower leaves of the tobacco plant and protect them from injury by any of the mechanisms.

* * * * *